June 9, 1964     C. K. MADER ETAL     3,136,624
METHOD FOR REDUCING METAL OXIDES
Filed May 24, 1961
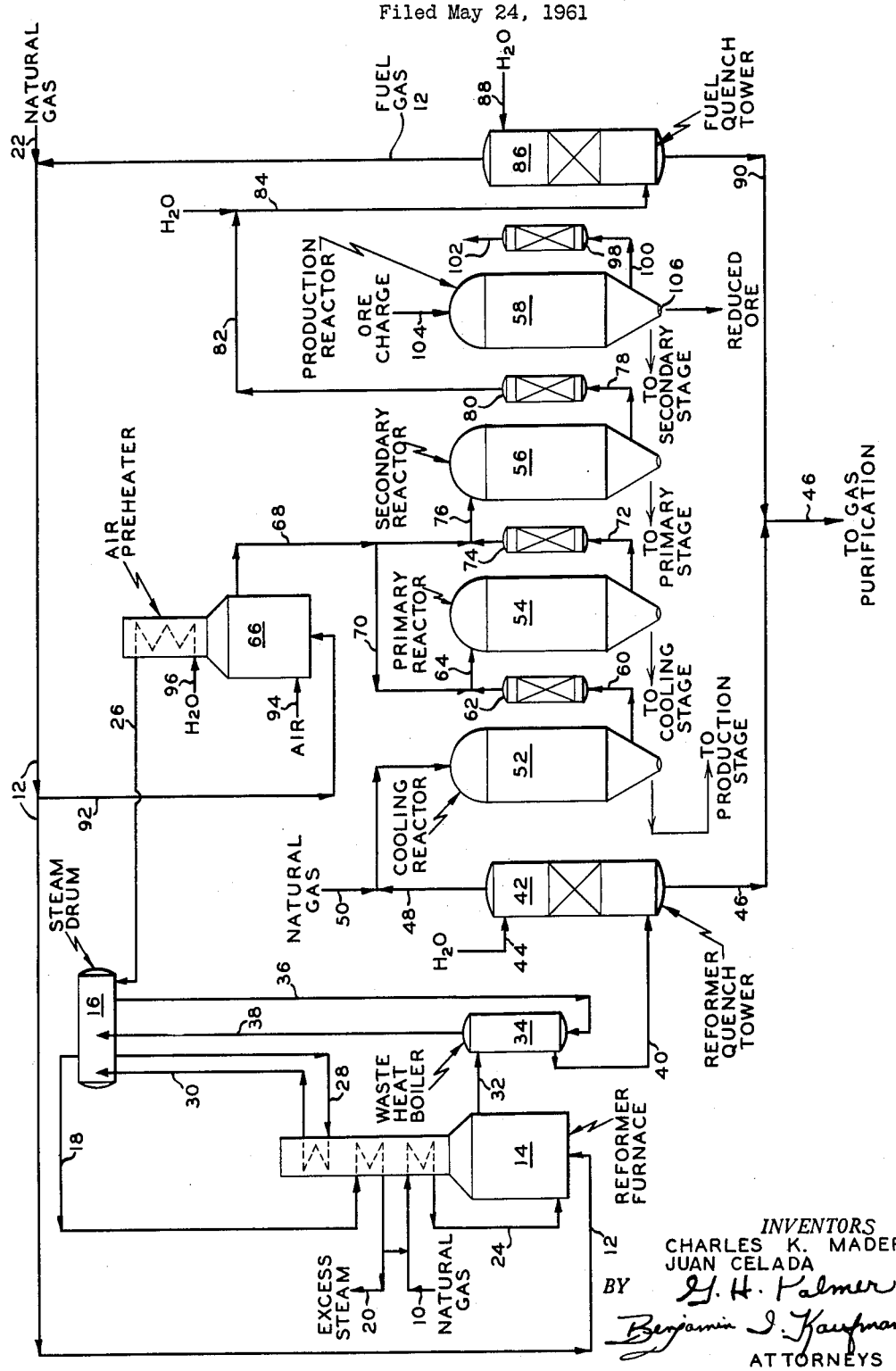
INVENTORS
CHARLES K. MADER
JUAN CELADA
BY
ATTORNEYS United States Patent Office 3,136,624
Patented June 9, 1964

3,136,624
METHOD FOR REDUCING METAL OXIDES
Charles K. Mader, Cold Spring, N.Y., and Juan Celada, Monterrey, Nuevo Leon, Mexico, assignors of one-half to Pullman Incorporated, Chicago, Ill., a corporation of Delaware, and one-half to Hojalata y Lamina, S.A., Monterrey, Nuevo Leon, Mexico, a corporation of Mexico
Filed May 24, 1961, Ser. No. 112,260
9 Claims. (Cl. 75—34)

This invention relates to a method for reducing metal oxides to their metals. In one of its aspects, the invention relates to a method for the direct reduction of metal oxides, such as iron ores, and other iron oxides, with a reducing gas to convert these materials to their metallic iron state, particularly into the form of pellets or masses of sponge iron which may be ground to a powder or employed as a melting stock for further use.

This application is a continuation-in-part of our prior and co-pending application Serial No. 67,220, filed November 4, 1960.

Prior to the present invention, processes heretofore proposed for the production of reduced iron in the form of porous solids, referred to as "sponge iron," comprise the conducting of an operation by either admixing the raw iron with coal or coke, or by passing a reducing gas in contact with a bed of iron ore or in contact with a mixed bed of iron ore and solid reducing agents. It has been found, however, that these processes have economic utility only when employed in the reduction of iron ore where relatively small quantities of the ore are desired to be reduced. Thus, the processes heretofore proposed have been found to be economically unattractive by reason of the fact that they either fail to provide for a relatively high degree of conversion of the iron ore to the metallic iron and at a relatively high rate, or because they involve the use of expensive raw materials in carrying out the reduction treatment.

It is, therefore, an object of the present invention to provide a novel method for reducing metal oxides to their metals.

Another object of the invention is to provide a novel method for reducing iron ores, and other iron oxides to the metallic iron.

Still another object of the invention is to provide a novel method for the reduction of iron ores, and other iron oxides, to produce sponge iron.

A further object of the invention is to provide a novel method for reducing iron ores to the metallic iron in the form of sponge iron, in a high degree of conversion and at a high rate.

A still further object of the invention is to provide a novel method for the continuous reduction of iron ores to produce sponge iron, employing a continuous supply of a reducing gas having a uniform composition, and which may be maintained at a substantially relatively high temperature, and in which the reduced product contains a significant quantity of carbon to render it suitable and to facilitate the ease with which it can be converted to steel.

Other objects and advantages inherent in the invention will become apparent to those skilled in the art from the following description and the accompanying drawing.

In accordance with the present invention, there is provided an improved process for the direct reduction of metal oxides, for example, iron ore, or iron oxide materials, by passing a reducing gas or a reducing gas mixture through beds of the material or ore in a series of controlled steps or stages comprising a system of reactors, in the manner hereinafter described, to produce the sponge metal, for example, sponge iron, as a product of the process. In this manner, the aforementioned objects of the invention are attained, in that the ore, for example, hematite ($Fe_2O_3$), can be reduced to the extent of obtaining conversion on an average of up to about 95 percent thereof in the form of metallic iron. This represents the removal of up to about 97 percent of the oxygen which was originally present in the ore as ferrous oxide.

An important feature of the process of the present invention resides in the ability to obtain a reduced ore product upon which a substantial quantity of carbon is deposited. Carbon thus deposited on the reduced product is of importance in subsequent melting operations, for example, in the production of iron or steel products. In this respect, it is found that during the melting operation, the carbon deposited on the reduced product will diffuse into the product and make possible the melting thereof at temperatures significantly below that of the melting point of the pure metal. In the past, the addition of carbon to the reduced iron product during the melting operation, did not result in the ability to achieve a melt at such low temperatures as is possible in accordance with the process of the present invention. Another feature of the present process resides in obtaining a metal product in which significant quantities of carbon are present, for example, in the ultimate production of steel.

As more fully hereinafter discussed, this deposition of carbon on the reduced product is effected during a so-called "cooling stage" of the process, in which, generally, a stream comprising a carbon-containing reducing gas is preheated to raise a portion of this reducing gas to an elevated temperature. Thereafter, a mass of the partially reduced metal oxide is contacted with the thus-heated stream to cause the cracking of a portion of the reducing gas, and results in the deposition of carbon upon the metal oxide. A portion of the remaining reducing gas is then employed to reduce a further portion of the partially reduced metal oxide to obtain a product which comprises carbon-containing reduced metal material.

In general, the reduction operation is carried out in a reactor system, preferably comprising a battery of four reactors (or operation stages), although it will be understood that it is within the scope of the process of the present invention to provide for additional operation stages, or reactors, if so desired. Each of the reactors is directly coupled to a heat accumulator. The reactors and heat accumulators are connected by pipes in a manner which permits by-passing a reactor-heat accumulator pair for maintenance and other purposes. The gas flow between the reactors is controlled by valves, which are operated from a control area. As more fully hereinafter described, in operation, one of the four reactors is in a primary position, one in a secondary position, one in a cooling position and one is being unloaded and loaded at any given time. In operating at the design capacity, each reactor remains in each of the four positions (in one embodiment of the process of the present invention), for a period such as three hours, thus resulting in a total cycle time of twelve hours for each reactor.

The primary gas employed for reducing the raw ore, is generally produced from atmospheric air and reducing gases which contain carbon monoxide and hydrogen as principal components. Reducing gases that are high in carbon monoxide and hydrogen can be produced, for example, from natural gas and then mixed with steam and then catalytically converted to carbon monoxide and hydrogen in accordance with known commercial operations. It is also possible, in this respect, to employ a conventional water-gas reaction to produce the desired reducing gas. In a preferred embodiment of the present invention, the reducing gas employed for carrying out the reduction operations, may be obtained by desulfurization of natural gas, which is split into several streams. Each stream is then mixed with superheated steam and passed through a convection section of one of a series of reformer furnaces, normally employed in reforming operations. From the individual convention sections, the preheated gas stream passes into the radiant section of the reformer furnace where the natural gas reacts, in vertical tubes which are packed with catalytic material, with the steam to form carbon monoxide and hydrogen. The gas stream is then passed through the waste heat boiler to recover the sensible heat from the gas. In order to minimize cooling-water requirements, each gas stream is passed through an air cooler before all of the individual streams are combined and cooled in a reformer quench tower. These quenched products, referred to as "primary gas," comprise about 85 percent carbon monoxide and hydrogen.

The cold primary gas from the aforementioned reformer quench tower, is introduced into a reactor which is in the cooling position of the reduction cycle. In this reactor, the primary gas is heated by hot sponge iron. During cooling of the product, carbon is deposited in the bed by the reducing gas, as previously indicated, to an extent from about 1 to 3 percent by weight, and which may also be enriched by the addition of natural gas. In many instances the amount of carbon deposited in the bed may be further increased, for example from about 5 to about 8 percent by weight, by controlling the composition of the reducing gas, or by reducing the carbon dioxide content of the gas. The deposition of carbon, in this manner, has been found, as previously indicated, to achieve a melt at relatively low temperatures and to aid quality control of the product during the subsequent melt. From the cooling reactor, the gases pass through the cooling reactor heat accumulator, the primary reactor and its heat accumulator and the secondary reactor and its heat accumulator, in that order. The secondary reactor serves as the preheating and partial reduction step, and in this reactor oxygen removal is carried out to the extent of up to 38 percent of that which is present as the metallic iron. The bulk of the oxygen removal is carried out in the primary reactor (for example, from about 38 to 80 percent). The cooling reactor, which comprises the finishing step, results in the removal of still more oxygen, representing a product from which up to about 80 to 90 percent of the oxygen present in the original raw ore product has been removed.

Each of the reactors is provided with a combustion chamber, not illustrated, for the sake of simplicity. During the primary and secondary steps, air is injected in the gas streams to raise the temperature level of the gas to temperatures in the range of approximately 1300° F. to 2600° F. In most operations, temperatures between about 1800° F. and about 2200° F. are preferred. In order to avoid possible sticking or agglomeration of the metal particles, it is preferred that the average temperature maintained in the secondary step, be approximately 100° F. lower than that maintained in the primary step. The air employed in the partial oxidation is compressed and preheated to temperatures within the range of about 1200° F. and about 1800° F. in a tubular air preheat furnace. Temperatures between about 1400° F. to about 1600° F. are generally preferred for the optimum utility from an economic standpoint. The gas stream from the secondary heat accumulator is cooled to a temperature between about 120° F. and about 200° F. by the injection of water into the effluent line. Preferably, the gas stream is cooled to a temperature between about 150° F. and about 175° F. Further cooling of the gas stream to a temperature below about 100° F., depending upon the temperature of the cooling water introduced, is effected in the fuel quench tower, where water vapor resulting from the oxidation of the process gas is condensed. The resulting tail gas comprising as a major combustible component, carbon monoxide and hydrogen, is employed as a fuel gas. Natural gas may be added to the plant. The cold sponge iron is then removed through the bottom of the reactor, and is then ready for further use.

To maintain the necessary reduction conditions in the respective secondary, primary and cooling zones, the composition and temperature of the respective components comprising the gaseous reducing mixture, constitute a critical feature of the present process. In this respect, it will be noted that the reducing gas itself, may comprise hydrogen, carbon monoxide or mixtures thereof. Oxygen employed for combustion to raise the temperature of the reducing gas to that required for carrying out the reduction of the iron ore, as discussed above, may comprise either pure oxygen or an oxygen-containing gas, such as air. In order to carry out the desired degree of reduction in each of the aforementioned three reactors, it has been found that the ratio of oxygen to the reducing gas should be lower in the secondary reactor than that employed in the primary reactor.

To achieve the desired reducing temperatures in each stage, the oxygen or oxygen-containing gas is introduced into the respective combustion chambers of the primary and secondary reactors at temperatures between about 60° F. and about 1800° F. When pure oxygen is employed, it is preferred that it be introduced into the combustion section of the reactor at a temperature between about 60° F. and about 100° F. When the oxygen is present in the form of air, the latter is preferably introduced into the combustion section of the reactors at temperatures between about 1400° F. and about 1600° F.

The reducing gas, for example, hydrogen, carbon monoxide or mixtures thereof, or gases containing these components, is introduced into the combustion chambers of the primary and secondary reactors at temperatures between about 60° F. and about 1800° F. It is preferred, however, to introduce the reducing gas into the primary reactor at a temperature between about 600° F. and about 1600° F. In the secondary reactor, the reducing gas is preferably introduced at a temperature between about 1500° F. and about 1600° F. The reducing gas employed in the cooling reactor is preferably introduced at a temperature between 60° F. and about 100° F.

In a normal operation, a different reactor is recharged with the ore and started, at predetermined intervals (for example, every three hours) progressing in numerical order through the battery of the reactors (for example, a battery of four reactors, namely from the first through the fourth reactor and then back, once more, to the first reactor). Thus, the charge, in a battery of four reactors, will pass through three reduction stages of three hours each, in each reactor. These three reduction stages comprise (1) a hot reduction treatment with partially spent hydrogen-rich gas; (2) a hot reduction treatment with gas of nearly fully strength; and (3) a completion of the reduction treatment while cooling down with full-strength cold gas. After the ore is passed through the aforementioned three reduction stages, there follows a reactor shut-down period for the removal of the sponge iron from a given reactor, which is then refilled with fresh ore. The operating cycle, it will be noted, also provides an additional three hours to put the reactor through the aforementioned fourth period.

As will be noted from the above, four operating stages have been provided for completing the ore reduction cycle. These four operating stages are referred to and described as follows: (a) secondary operating stage—in which the treating gas is in its second hot reducing stage, although the ore is in its first stage of reduction; (b) primary operating stage—in which the gas is in its first hot reducing stage, although the ore is in its second stage of reduction; (c) cooling operating stage—in which the ore is undergoing cooling and is in its last stage of reduction, while the gas is being heated; and (d) turnaround operating or production stage—in which the reduced ore (e.g., sponge iron) is removed from the reactor, completing the cycle, and the reactor is recharged for the commencement of a new cycle. Every three hours, a recharged reactor (i.e., the reactor which has just completed its turnaround) is started in cycle, and each of the other three reactors is placed in the next stage of its cycle by changing the points of gas entry and exit in the reactor battery. This shifting of the gas flow, progressively through the battery with the numerically first reactor following the fourth reactor, provides a countercurrent flow of gas against the advancing stages of the ore treatment.

It will be seen from the foregoing description that the reactor battery passes through the following four alignments during a typical 12-hour cycle (assuming that the first reactor, i.e., numerical reactor 1, starts cooling at 0 hours):

| Reactor | 0-3 hours | 3-6 hours | 6-9 hours | 9-12 hours |
| --- | --- | --- | --- | --- |
| 1 | Cooling | Turnaround | Secondary | Primary. |
| 2 | Primary | Cooling | Turnaround | Secondary. |
| 3 | Secondary | Primary | Cooling | Turnaround. |
| 4 | Turnaround | Secondary | Primary | Cooling. |

When a particular reactor's cooling stage is completed, the vessel and its attendant equipment are purged. The sponge iron is then unloaded after removing the heads and inner door, upon which the load rests in the bottom of the reactor.

In order to provide a better understanding of the improved process of the present invention, reference is had to the accompanying drawing which forms a part of this specification and, as an example, illustrates, diagrammatically, an elevational view of one form of the apparatus employed and capable of carrying out a preferred embodiment of the invention. It should be understood, however, that it is not intended that the invention be limited to the embodiment of the example as illustrated, but is capable of other embodiments which may extend beyond the scope of the apparatus illustrated. Some of the mechanical elements necessary to effect the transfer of solids, liquids and vapors to maintain the necessary operation conditions to carry out the functions of the apparatus, have been omitted in order to simplify the description. Furthermore, in the discussion of the drawing, it will be noted that the handling of the gas flow and the treatment and conveyance of the metal oxides or ores, are separately described for the purpose of simplification.

Referring to the drawing, natural gas is introduced into the system through conduit 10 at the rate of 13,900 s.c.f./ton of iron in the ore. This gas may comprise natural gas previously subjected to a conventional desulfurization treatment, if so required. The gas from conduit 10 is next transferred to a reformer furnace 14, which is a conventional hydrogen-producer or catalytic gas/steam reactor. This feed gas entering the reformer furnace 14 through conduit 10 is merged with superheated steam coming from steam drum 16 via conduit 18 and the furnace stack superheater coil at the rate of 1530 pounds per ton of the iron in the ore. Excess steam produced is removed via conduit 20 for further use where so desired. The mixture of feed gas and superheated steam heated, in a conventional manner, in the tubes (not shown) of the preheater section in the bottom of the furnace stack, flows downwardly to the radiant portion of the furnace via conduit 24, and is distributed through vertical tubes (not show) which are filled with catalytic material, for example, a nickel catalyst supported on an alumina base. In the reformer furnace 14, the natural gas/steam feed is heated to a temperature of about 1500° F.

Water employed for producing steam in drum 16 is introduced via conduit 26. Unvaporized water from drum 16 is transferred into the stack of furnace 14 via line 28. After being converted to steam in furnace 14, the latter is returned to drum 16 via line 30.

From reformer furnace 14, the hydrogen-rich effluent or process gas, comprising hydrogen and carbon monoxide, is subjected to a cooling treatment by being transferred through conduit 32 to a waste-heat boiler 34. Waste-heat boiler 34 may, if so desired, also be replaced by a heat exchanger. Boiler 34, in the system illustrated, operates on a convective water circuit from steam drum 16. For this purpose, water is transferred from steam drum 16, via conduit 36, to boiler 34. Effluent steam from boiler 34 is withdrawn and transferred through conduit 38 to steam drum 16, for use. From boiler 34, the cooled process gas is transferred via conduit 40 to a reformer quench or spray tower 42, where open water, introduced through conduit 44, cools the gas stream to a temperature within the range of about 60° F. to about 100° F., as the gas flows through Raschig rings positioned within the tower. Excess steam, i.e., steam not consumed in reformer furnace 14, is condensed in tower 42 and removed, together with cooling water, from the system via conduit 46.

The cooled processed gas from tower 42 is withdrawn through conduit 48 and comprises from about 70 to 75 percent hydrogen. The remaining components in this gas comprises methane, carbon monoxide, carbon dioxide and water vapor. Natural gas may also be added to the process gas in conduit 48, via conduit 50, so that the methane content of the process gas may be increased, if so desired. Tower 42 is held at a pressure of about 55 p.s.i.g. to provide sufficient pressure for the transfer of the cooled process gas, via conduit 48, to each reactor as it assumes the position of the cooling stage as shown by cooling reactor 52. At this point, it should be noted that for the purposes of this description, it will be assumed that reactor 52 is in the cooling stage, reactor 54 is in the primary reduction stage, reactor 56 is in the secondary reduction stage, and reactor 58 is in the turnaround or production stage, by the proper manipulation of suitable valve arrangements, which have been omitted from the drawing for the sake of simplicity.

Continuing with the flow of cooled gas from tower 42, and augmented by natural gas which is introduced through conduit 50 if desired, the gas stream is transferred via conduit 48 at the rate of 50,000 s.c.f./ton of iron in the ore to reactor 52, which is in the cooling position, to the combustion section or chamber (not operating in the cooling stage), to the space above the ore bed of reactor 52 and through the hot bed (which is now cooling after having been in the primary stage of reactor 54). From reactor 52, the reducing gas, as it passes through conduit 60 and through heat accumulator 62, is heated to a temperature between about 600° F. and about 1600° F. From accumulator 62, the gas is withdrawn through conduit 64 to the combustion section of primary reactor 54. In the reactor 54, the preheated air is injected from air-preheater 66, via conduits 68, 70 and 64, in an air to gas ratio of about 0.15 to 0.25, to bring the steam up to a temperature of about 1900° F. to 2200° F. From reactor 54, the hot gas is withdrawn and transferred through conduit 72 to a heat accumulator 74, where it is maintained at a temperature of about 1500° F. to 1600° F. This gas, together with additional preheated air, in an air to gas ratio of about 0.15 to 0.25, from conduit 70 to bring the steam up to proper bed entry temperatures of about 1800° F. to 2000° F., is next transferred via conduit 76 to secondary reactor 56. After passing through the fresh ore of reactor 56, the gas is, from a practical standpoint, considered as spent. From reactor 56, the spent gas is withdrawn and transferred through conduit 78 to heat accumulator 80. This gas is withdrawn through conduit 82 at a temperature between about 200° F. and about 1600° F.

It will be noted, at this point, that the gas in conduit 82 is blocked off from production reactor 58, which is in the unloading/loading or turnaround stage. The spent gas from accumulator 80 is transferred via conduits 82 and 84 (in admixture with further quantities of cooling water introduced into conduit 84) into a packed spray or fuel quench tower 86. Additional quantities of cooling water are introduced into tower 86 via conduit 88. The cooling water employed in tower 86 is withdrawn via conduit 90 and, in combination with cooling water from tower 42 is transferred via conduit 46 to a degassing or gas elimination treatment, not shown. The cooled spent gas from tower 86 is withdrawn via conduit 12 for further use in furnace 14 as fuel gas. This may be augmented by the addition of natural gas introduced via conduit 22. A portion of this gas may be withdrawn from conduit 12 via conduit 92. This gas may be transferred into air preheater 66 for use as a fuel gas, for heating air which is introduced into preheater 66 through conduit 94. Water, employed for use in steam drum 16, is introduced through conduit 96 into preheater 66. It will be noted in the drawing, that reactor 58 is illustrated in the turnaround position. This reactor is also employed in conjunction with its own heat accumulator 98 which is joined to reactor 58 by conduit 100. Gases from accumulator 98 are withdrawn via conduit 102 for use in the process, as previously described. The fresh ore charge employed in the process is introduced into reactor 58 through conduit 104, and the final reduced sponge ore product is removed from reactor 58 through outlet means 106. It will also be noted, as shown in the drawing, that reactor 58, following the discharge of reduced ore is now ready to assume the secondary reaction stage, in the position occupied by reactor 56, as shown.

Considering now the treatment and conveyance of the metal oxide or ore being treated, which, for the purposes of this example, comprising raw hematite ($Fe_2O_3$) ore, a predetermined mass of the ore, is introduced through conduit 104 into production reactor 58 (which is in the unloading or turnaround position, as illustrated in the drawing). By proper valve manipulation (not shown), reactor 58 is "brought into the secondary reactor position" as illustrated by reactor 56. As previously indicated, preheated air at a temperature between about 1400° F. and 1600° F. in conduit 68 is injected into the gas stream in conduit 76, via conduit 70, to raise the temperature level of the gas to approximately 1800° F. to 2000° F. and at this temperature is introduced into reactor 56. Secondary reactor 56 serves as a preheating and partial reduction stage. After being maintained in this "position" for a period of three hours (employing a typical 12-hour cycle for a complete production), approximately 38 percent of the oxygen present in the ore as metallic oxide has been removed. Following the partial reduction stage as illustrated by reactor 56, reactor 58 is next brought into the primary reactor position, illustrated by reactor 54. In reactor 54, preheated air from conduit 70 is injected into the gas stream in conduit 64 to raise the temperature level of the gas to a temperature of 1900° F. to 2200° F. and at this temperature is introduced into reactor 54. Primary reactor 54 serves as a means for carrying out the bulk of the oxygen removal. In reactor 54, an additional 42 percent of the oxygen present in the ore is removed during a period of three hours, representing a total oxygen removal of approximately 80 percent. Following the reduction treatment as illustrated by reactor 54, by proper valve manipulation, reactor 58 is brought into the cooling reactor position, illustrated by reactor 52. In reactor 52, process gas in conduit 48, augmented by natural gas introduced through conduit 50, if so desired, is introduced at a temperature of 60° F. to 100° F. into the reactor. For a period of three hours, the final reduction treatment therein results in obtaining a reduced ore product from which approximately 90 percent of oxygen originally present in the raw ore product has been removed. Following the treatment in reactor 52, this reactor is then brought into the position of production reactor 58, by proper valve manipulation, where, after undergoing a sponge iron removal period, is then ready for a fresh charge and a repetitive treatment of the newly added ore. As previously indicated, every three hours a recharged reactor (i.e., the reactor which has just completed its turnaround or production stage) is started in the cycle with each of the other three reactors being placed in the next stage of its cycle, by changing the points of the process gas entry and exit in the reactor battery. It will thus be seen that the aforementioned shifting of the gas flow progressively through the battery of reactors, with the numerically first reactor following the fourth reactor, results in bringing a countercurrent flow of gas against each advancing stage of the ore treatment.

In carrying out the aforementioned operation, certain manipulative operations are preferably observed and employed. In this respect, it is found that the rate of oxygen removal from the ore increases with higher temperature, and therefore it is found that variations in the primary and secondary stage combustion air ratios may be employed to affect the rate of reduction. If temperatures above 1800° F. are employed, care must be exercised to avoid fusing the reactor load. The temperature at the inlets to the heat accumulators are employed as a check of the temperature conditions maintained in their corresponding reactors.

The rate of reduction activity has been found to depend upon the amount and temperature of reducing gases that are available during the reaction with the ore. In general, the improved process of the present invention requires a relatively large quantity of hydrogen in excess of the amount which is actually consumed in the treatment within each reactor. In this respect, it is found that the ore reduction usually consumes about one-half of the hydrogen which is produced in the reformer furnace. Of this quantity, a small amount is consumed in the combustion chambers, with the remainder being withdrawn for use as a fuel gas.

The following equations serve to illustrate the specific reductions which occur within the reactors. In these equations, hydrogen is shown as the reducing agent, although carbon monoxide will remove some of the oxygen content of the ore, particularly at lower temperatures, employed in the cooling stage. Excess hydrogen tends to drive these reactions towards completion.

(1) $3Fe_2O_3 + H_2 = 2Fe_3O_4$(magnetic ore)$+ H_2O$
(2) $Fe_3O_4 + H_2 = 3FeO$(ferrous oxide)$+ H_2O$
(3) $FeO + H_2 = Fe + H_2O$ Reaction 3 does not occur as readily as Reactions 1 and 2, and is aided by high hydrogen and low water-vapor concentrations. Therefore, the conditions in the primary reactor stage and the beginning of the cooling stage will encourage completion of the ore reduction.

In the cooling step, as previously indicated, the deposition of carbon is effected by contact of the partially reduced metal oxide with the stream of the carbon-containing reducing gas. The following equations will therefore illustrate the specific types of reaction which can occur in this stage, in which carbon is produced and deposited upon the oxide.

(4) $2CO \rightarrow CO_2 + C$
(5) $Fe + C \rightarrow FeC$
(6) $CH_4 \rightarrow C + 2H_2$ With respect to Reaction 6, it is found that if the quantity of methane in the reducing gas is maintained at a low limit, for example from about 2 to about 5 percent, less carbon is deposited than if the amount of methane present is maintained at a relatively high rate, viz., above the aforementioned range.

The extent of the reduction of the ore, it should be noted, is also dependent upon the time of exposure to the process gas, unless the cycle in use is bringing the gas and ore nearly to equilibrium in the hot and cold stages. As will be seen from the foregoing discussion, the reaction time is 9 hours (viz., from the beginning of the ore heating to the end of the cooling operation) in a 12-hour cycle being used in the embodiment shown. However, it should be noted that the ore is also undergoing satisfactory reduction conditions for a shorter period. If the remaining conditions are unchanged, it is found that the shortening of the reduction time will have a tendency to leave a higher oxygen content in the sponge iron. Thus, it is within the scope of the present invention to operate for shorter reduction cycles, or with changes in length of stages within the 12-hour cycle. The time factor can be employed to offset some loss in gas efficiency when one reactor is shut down for repair or maintenance purposes. The three remaining reactors can then be placed on a longer cycle, even though such action may result in decreased capacity. When only three reactors are operable, the turnaround stage can be shortened as much as possible so as to obtain some secondary stage reaction on each fresh load of ore, before placing it in the primary stage.

As previously indicated, the reformer furnace or series of reformers are employed to catalytically react hydrocarbons principally with steam to produce hydrogen and oxides of carbon. An excess of steam is employed in order to cause the reaction to progress. If a sufficient excess of steam is employed, it is found that carbon formation and its deposit upon the catalyst is prevented. Generally, steam to gas ratios may be employed as high as 3.0 to 1.0 (on a mol basis) to remove carbon. Ratios of about 2.2 to 1.0 are preferred. In general, it has been found expedient to keep this ratio high whenever reformer operation or rate of feed gas delivery is irregular. Lower steam ratios tend to produce more carbon monoxide in the reformer effluent, and increased amounts of carbon monoxide tend to increase carburization of the sponge iron.

As indicated above, the process of the present invention, in the example illustrated, has a preferred applicability to the reduction of iron ores and iron oxides to the metallic state, particularly in the form of sponge iron. It should be noted, however, that the present process may also be successfully applied to the reduction of other metal oxides to their metals or in the form of sponge metals. Thus, the present process may be employed for the reduction of ores or oxides comprising such metals or metal components as copper, phosphorus or nickel, which are handled in accordance with the treatment described, to produce the corresponding elemental metal or metallic spongy masses. In addition, it should be noted that while a particular embodiment of the improved process of the present invention has been described for purposes of illustration, various modifications and adaptations thereof, which will be obvious to those skilled in the art may be made within the spirit of the invention and without departing from its scope.

We claim:

1. A method for reducing metal oxides in which heat for reduction of metal oxide is provided by direct contact of reducing gas with metal oxide which comprises: providing a mass of partially reduced metal oxide at an elevated temperature in a reduction zone, introducing a stream comprising a carbon-containing reducing gas to said mass of partially reduced metal oxide to preheat said stream and concomitantly cool said mass; contacting a further portion of said mass with said thusly-heated stream to cause cracking of a portion of said reducing gas with the deposition of carbon on said metal oxide; and reducing a further portion of said mass with a portion of the remaining reducing gas to obtain a product comprising a carbon-containing reduced metal oxide.

2. The method of claim 1 in which the metal oxide comprises iron.

3. The method of claim 1 in which the metal oxide comprises copper.

4. The method of claim 1 in which the metal oxide comprises phosphorus.

5. The process of claim 1 wherein said stream comprising a carbon-containing reducing gas is introduced at a temperature between about 60° F. and about 100° F.

6. The process of claim 5 wherein said stream comprises reformed natural gas of controlled methane content.

7. The process of claim 5 wherein said stream comprises reformed natural gas of controlled carbon monoxide content.

8. In the direct reduction of iron ore to sponge iron in which heat for reduction of metal oxide is provided by direct contact of reducing gas with metal oxide the improvement which comprises providing a carbon-containing reducing gas having a controlled composition with respect to the carbon-content thereof; separately providing a stationary mass of partially reduced iron ore at an elevated temperature; contacting said carbon-containing reducing gas maintained at a temperature between about 60° F. and about 100° F. and said mass of partially reduced iron ore to preheat said reducing gas to an elevated temperature and cool said mass; contacting a further portion of said mass of partially reduced iron ore with said thusly-heated reducing gas to cause cracking of a portion of the reducing gas with the deposition of carbon on said iron ore; and contacting a further portion of said mass with the remaining reducing gas to obtain a product comprising a reduced metal oxide of controlled carbon-content.

9. A method for reducing metal oxides in which heat for reduction of metal oxide is provided by direct contact of reducing gas with metal oxide which comprises: providing a mass of partially reduced metal oxide at an elevated temperature in a reduction zone, introducing a stream comprising a carbon-containing reducing gas at a temperature between about 60° F. and about 100° F. to an upper portion of said mass of partially reduced metal oxide to preheat said stream and concomitantly cool said mass; flowing said stream downwardly through said mass and contacting a further portion of said mass with said thusly-heated stream to cause cracking of a portion of said reducing gas with the deposition of carbon on said metal oxide; and reducing a further portion of said mass with a portion of the remaining reducing gas to obtain a product comprising a carbon-containing reduced metal oxide; and withdrawing the remaining reducing gas from a lower portion of said mass to a second reduction zone.

References Cited in the file of this patent

UNITED STATES PATENTS

| Re. 19,706 | Brown | Dec. 3, 1935 |
| 1,370,915 | Riveroll | May 8, 1921 |
| 1,984,727 | Brown | Dec. 18, 1934 |
| 2,107,549 | Schmalfeldt | Feb. 8, 1938 |
| 2,740,706 | Paul et al. | Apr. 3, 1956 |
| 2,900,247 | Celada | Aug. 18, 1959 |